United States Patent
Hirabayashi et al.

(10) Patent No.: US 11,971,424 B2
(45) Date of Patent: Apr. 30, 2024

(54) AUTOMATIC ANALYZER

(71) Applicants: HITACHI HIGH-TECH CORPORATION, Tokyo (JP); ROCHE DIAGNOSTICS OPERATIONS, INC., Indianapolis, IN (US)

(72) Inventors: Yuichi Hirabayashi, Tokyo (JP); Dai Inagi, Tokyo (JP); Satoshi Yokotsuka, Tokyo (JP); Youichi Aruga, Tokyo (JP); Mohamed Abouelsoud, Mannheim (DE)

(73) Assignees: HITACHI HIGH-TECH CORPORATION, Tokyo (JP); ROCHE DIAGNOSTICS OPERATIONS, INC., Indianapolis, IN (US)

( * ) Notice: Subject to any disclaimer, the term of this patent is extended or adjusted under 35 U.S.C. 154(b) by 861 days.

(21) Appl. No.: 17/043,354

(22) PCT Filed: Mar. 20, 2019

(86) PCT No.: PCT/JP2019/011857
§ 371 (c)(1),
(2) Date: Sep. 29, 2020

(87) PCT Pub. No.: WO2019/198455
PCT Pub. Date: Oct. 17, 2019

(65) Prior Publication Data
US 2021/0025907 A1 Jan. 28, 2021

(30) Foreign Application Priority Data
Apr. 13, 2018 (JP) ................. 2018-077388

(51) Int. Cl.
*G01N 33/68* (2006.01)
*A01N 1/02* (2006.01)
(Continued)

(52) U.S. Cl.
CPC ..... *G01N 35/025* (2013.01); *G01N 35/00623* (2013.01); *G01N 35/1002* (2013.01);
(Continued)

(58) Field of Classification Search
CPC .......... G01N 35/025; G01N 35/00623; G01N 35/1002; G01N 35/1065;
(Continued)

(56) References Cited

U.S. PATENT DOCUMENTS

2007/0072299 A1* 3/2007 Orihashi ............... G01N 35/00
436/43
2018/0095077 A1 4/2018 Palangi et al.
2018/0113142 A1 4/2018 Nakano

FOREIGN PATENT DOCUMENTS

EP 2775307 A1 9/2014
JP 2009-52969 A 3/2009
(Continued)

OTHER PUBLICATIONS

International Preliminary Report on Patentability received in corresponding International Application No. PCT/JP2019/011857 dated Oct. 22, 2020.
(Continued)

*Primary Examiner* — Jennifer Wecker
*Assistant Examiner* — Oyeleye Alexander Alabi
(74) *Attorney, Agent, or Firm* — MATTINGLY & MALUR, PC

(57) ABSTRACT

An automatic analyzer is provided which is easier to investigate when some troubles such as data abnormality occur in a sample analysis result as compared with an automatic
(Continued)

analyzer according to the related art. The automatic analyzer includes: analysis units that perform analysis and quality control analysis for ensuring quality of the analysis; a storage medium that stores quality control results of the quality control analysis performed by the analysis units; a monitor that displays the quality control results; and a control PC that controls an operation of the analysis units (8, 9, and 16), executes, when an arbitrary result is selected from the quality control results stored in the storage medium, based on the selected quality control result, statistical calculation of the selected result and a quality control result performed in the past, and causes the monitor to display a statistical calculation screen as a statistical calculation result.

9 Claims, 8 Drawing Sheets

(51) Int. Cl.

| | |
|---|---|
| *B01L 3/00* | (2006.01) |
| *C07C 309/65* | (2006.01) |
| *C07C 309/73* | (2006.01) |
| *G01N 1/40* | (2006.01) |
| *G01N 21/01* | (2006.01) |
| *G01N 21/31* | (2006.01) |
| *G01N 21/33* | (2006.01) |
| *G01N 21/64* | (2006.01) |
| *G01N 27/414* | (2006.01) |
| *G01N 33/52* | (2006.01) |
| *G01N 33/532* | (2006.01) |
| *G01N 33/543* | (2006.01) |
| *G01N 33/569* | (2006.01) |
| *G01N 33/72* | (2006.01) |
| *G01N 35/00* | (2006.01) |
| *G01N 35/02* | (2006.01) |
| *G01N 35/04* | (2006.01) |
| *G01N 35/10* | (2006.01) |

(52) U.S. Cl.
CPC ............... *G01N 35/1065* (2013.01); *G01N 2035/00465* (2013.01); *G01N 2035/00653* (2013.01); *G01N 2035/00891* (2013.01); *G01N 2035/0443* (2013.01); *G01N 2035/0453* (2013.01)

(58) Field of Classification Search
CPC .......... G01N 2035/00465; G01N 2035/00653; G01N 2035/00891; G01N 2035/0443; G01N 2035/0453; G01N 2035/00673; G01N 2035/0444
See application file for complete search history.

(56) References Cited

FOREIGN PATENT DOCUMENTS

| | | | |
|---|---|---|---|
| JP | 2010-21703 A | 9/2010 | |
| JP | 2010-217039 | 9/2010 | |
| JP | 2015-9219 A | 5/2015 | |
| JP | 2015-92196 | 5/2015 | |
| WO | 2016/140017 A1 | 9/2016 | |
| WO | WO-2016140017 A1 * | 9/2016 | ............. G01D 9/005 |

OTHER PUBLICATIONS

Supplementary European Search Report received in corresponding Application No. 19784352.7 dated Dec. 6, 2021.
International Search Report of PCT/JP2019/011857 dated Jun. 25, 2019.

* cited by examiner

[FIG. 1]
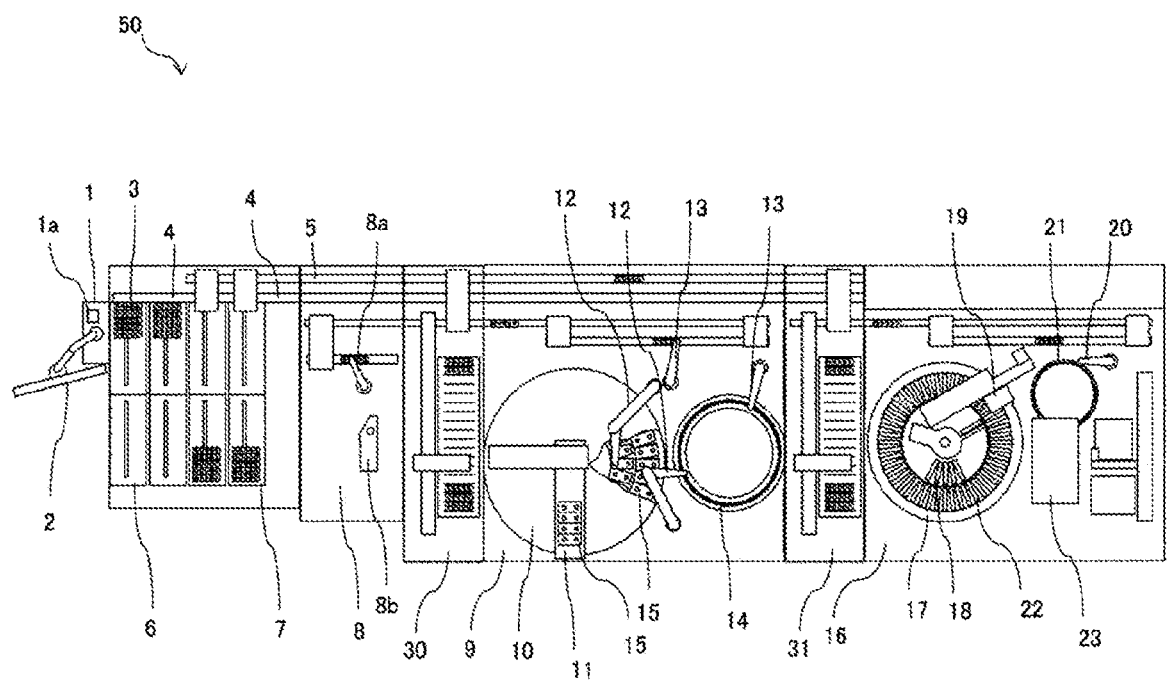

[FIG. 2]
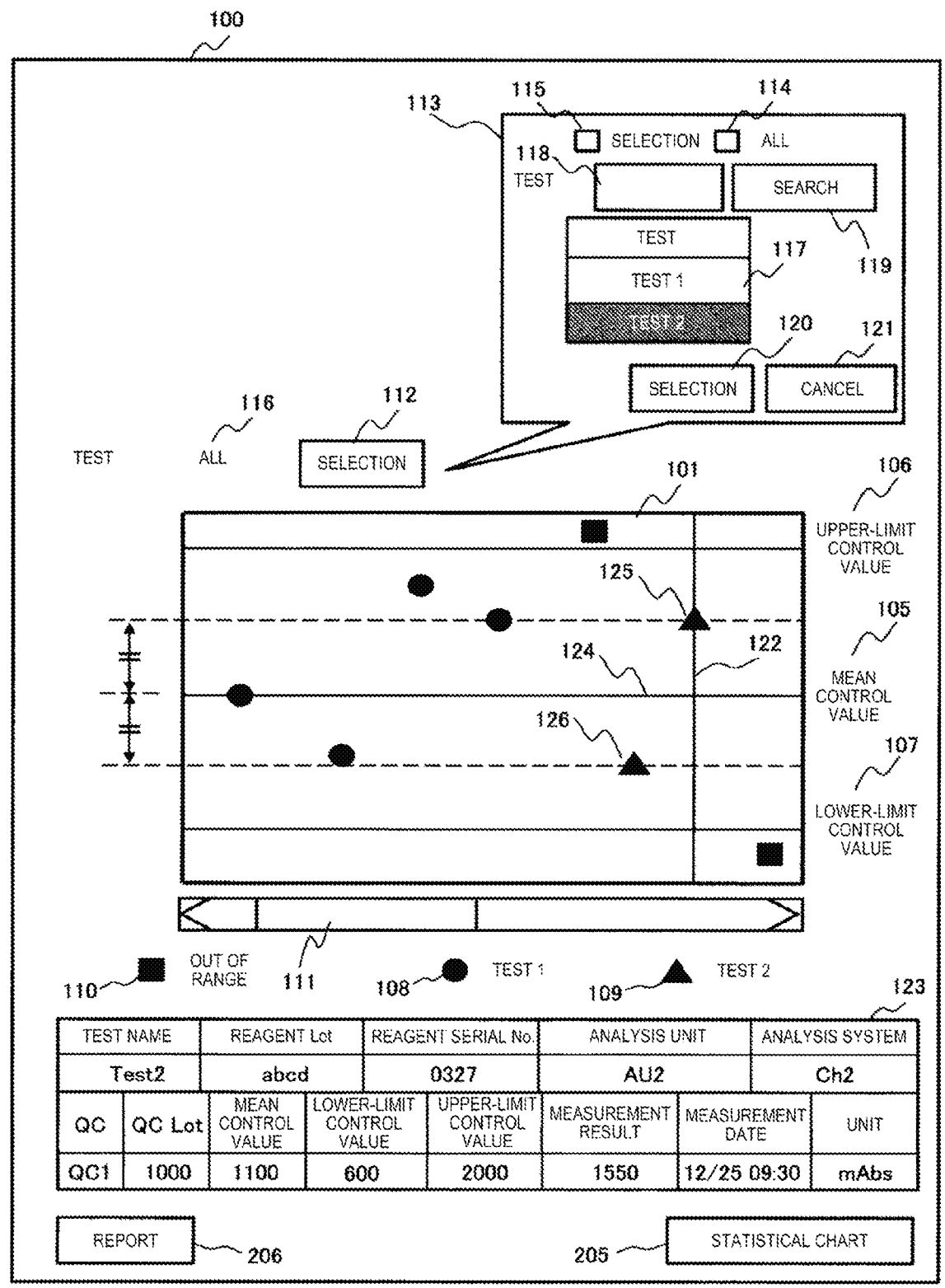

[FIG. 3]
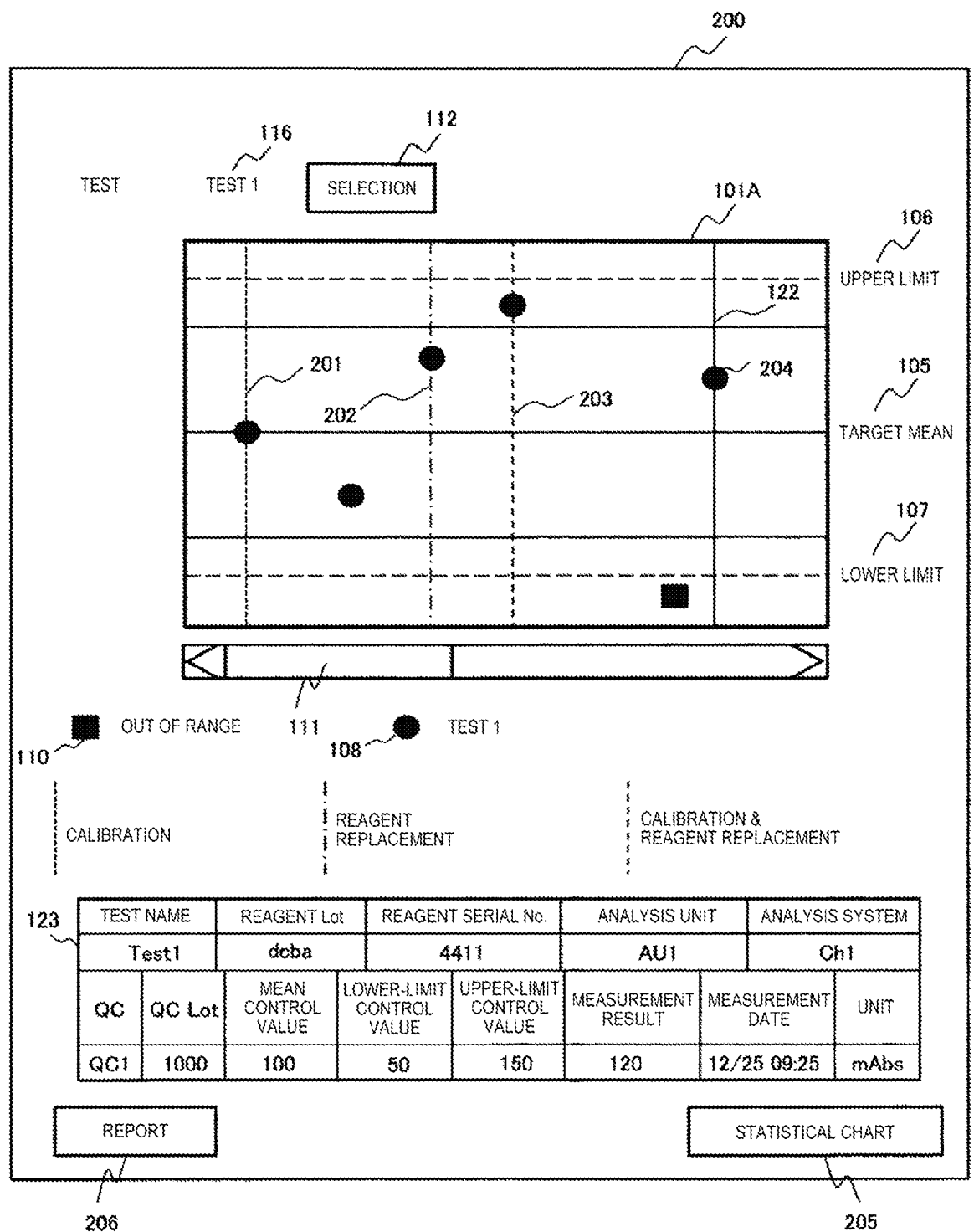

[FIG. 4]
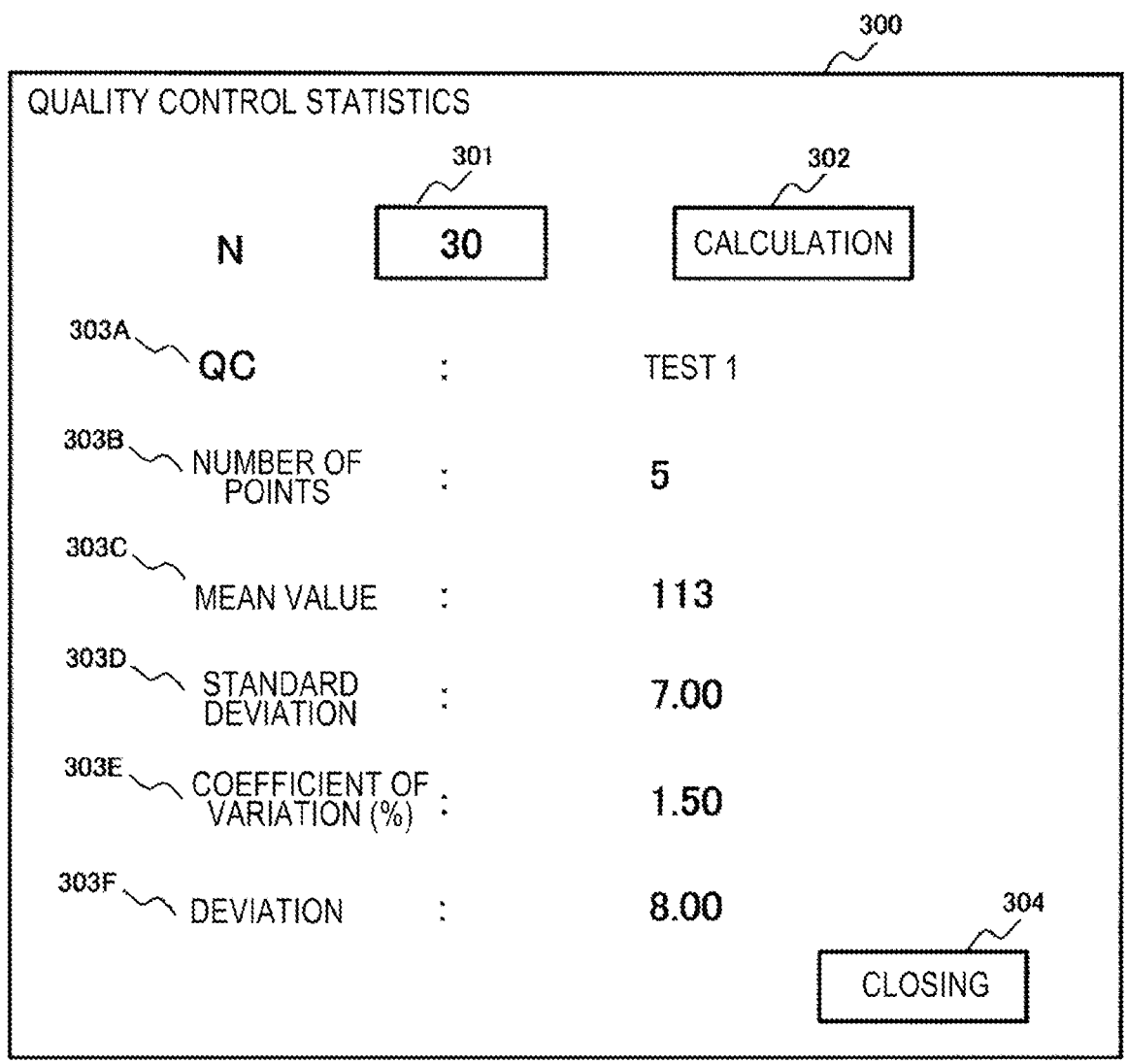

[FIG. 5]
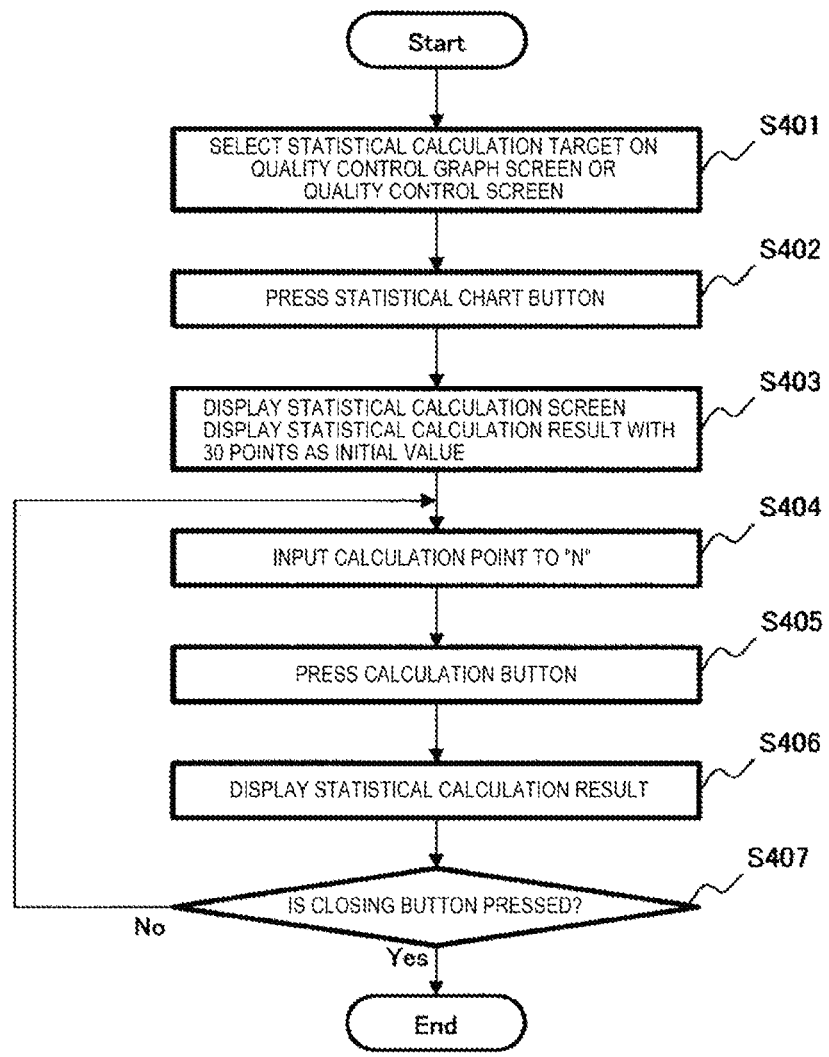

[FIG. 6]
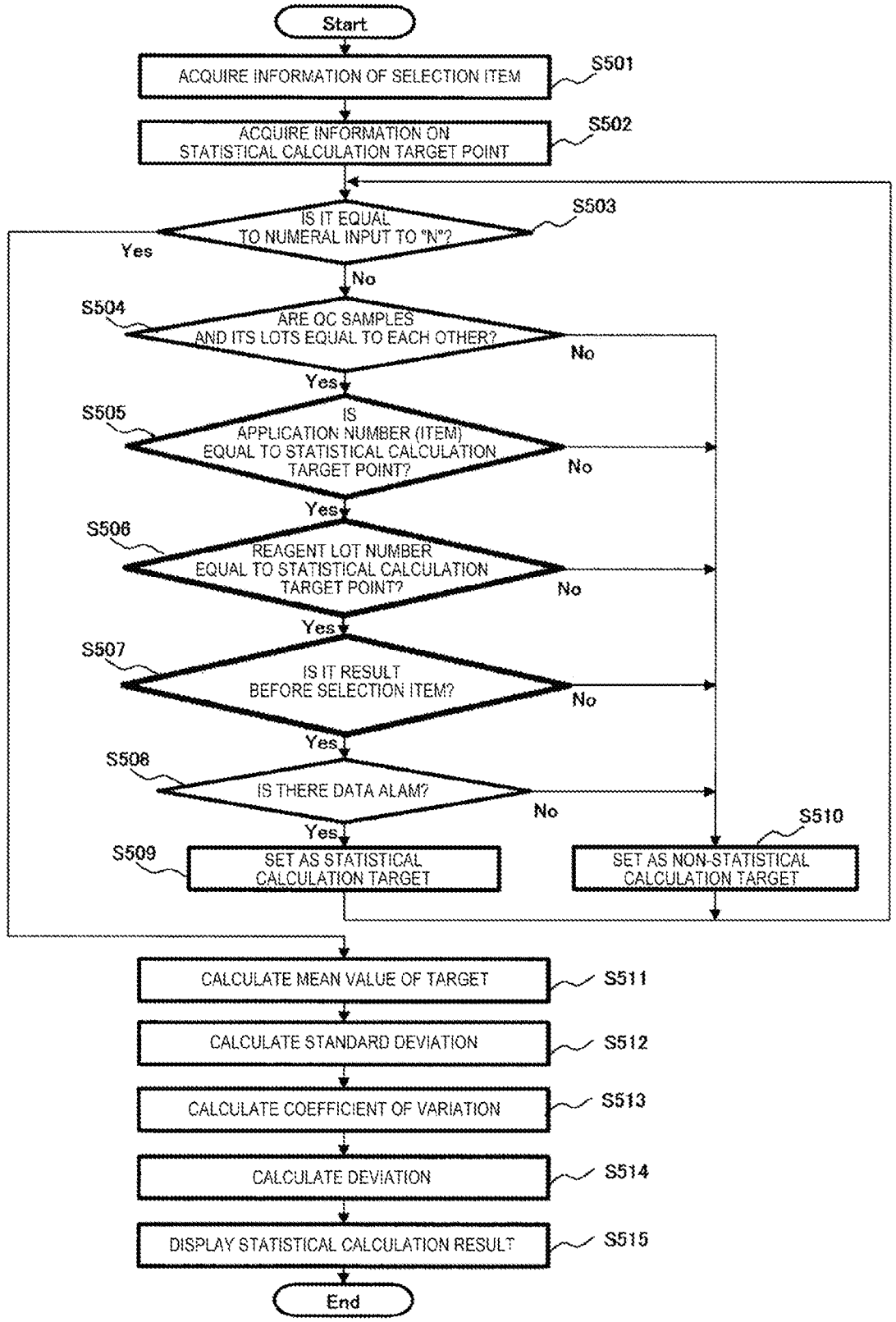

[FIG. 7]
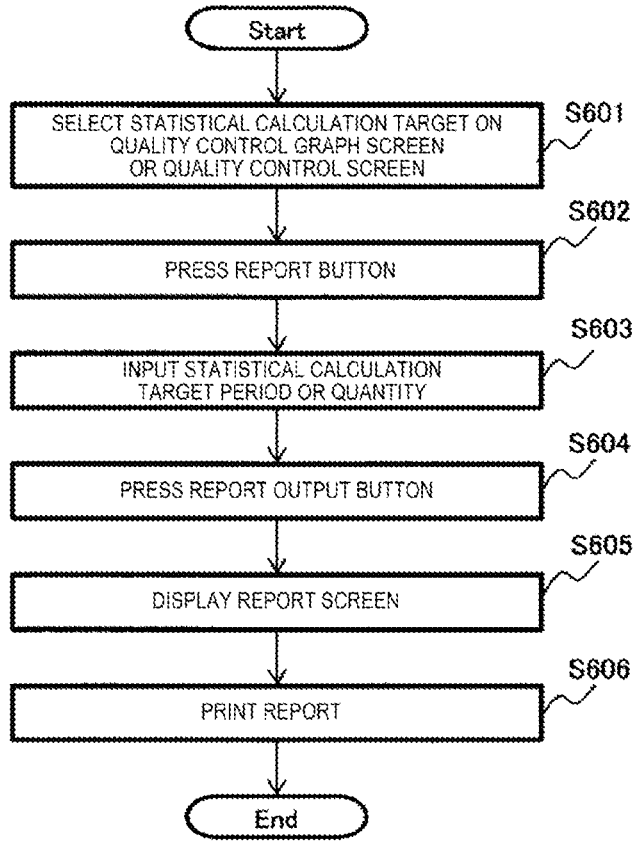
[FIG. 8]

[FIG. 9]
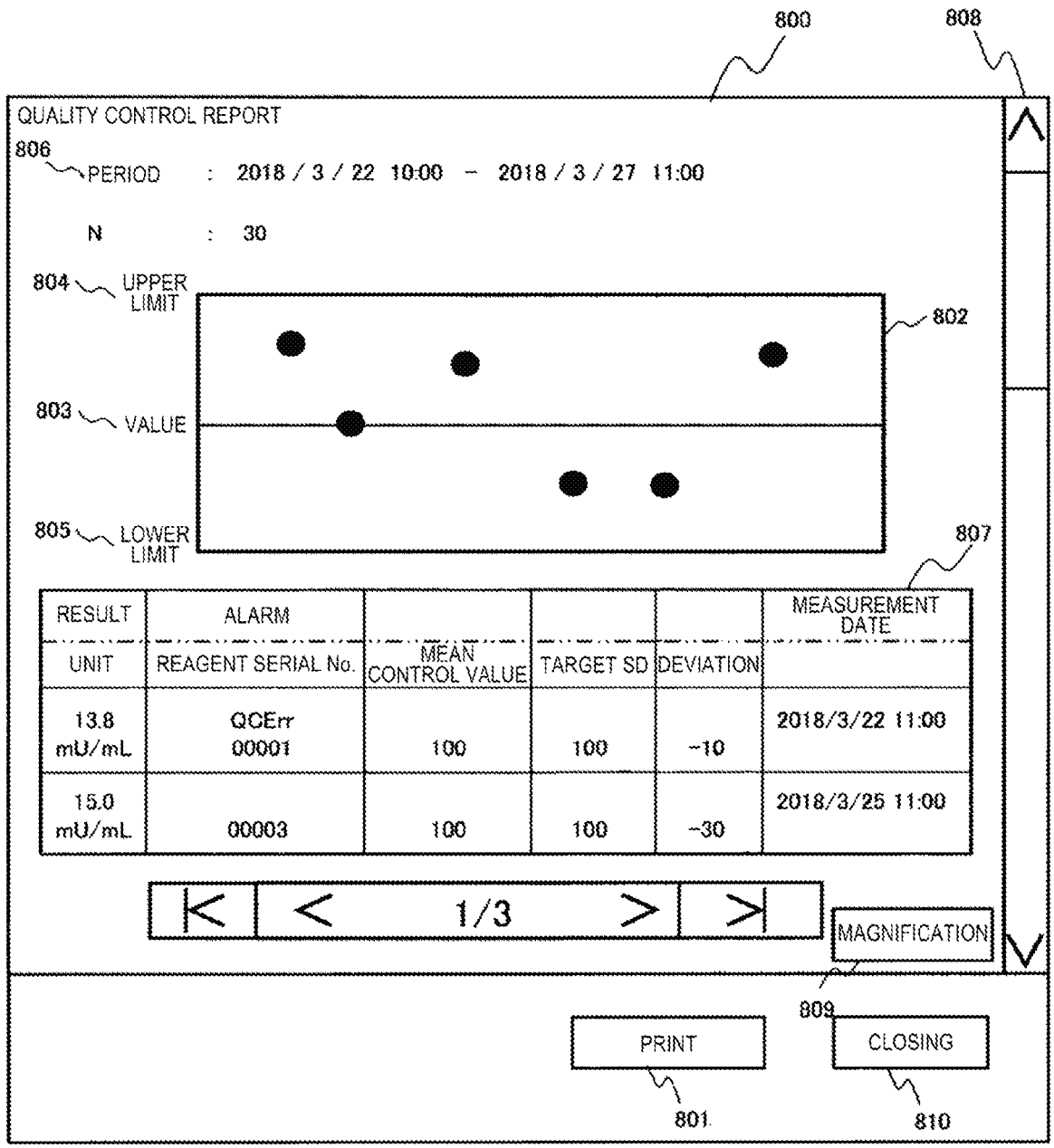

AUTOMATIC ANALYZER

TECHNICAL FIELD

The present invention relates to an automatic analyzer.

BACKGROUND ART

Patent Document 1 discloses an automatic analyzer that includes an analysis unit that performs an analysis process of analyzing a sample of an analysis target, a storage unit that stores results of the analysis process, cumulative information regarding occurrence of events such as registration, change, or deletion of an analysis parameter of an analysis condition or the like, and cumulative information regarding occurrence of events such as registration, deletion, or replacement of reagent information that is information on a reagent used for analysis of a sample for each of analysis items for a sample, a display unit that displays the analysis results of the sample and information regarding an occurrence situation of an event, and a control unit that controls operation of an analysis process of a sample by the analysis unit and reads out information on an event of an analysis parameter and information on an event of reagent information from the storage unit and then displays the read-out information in a time series on the display unit.

PRIOR ART DOCUMENT

Patent Document

Patent Document 1: PCT Patent Publication No. WO2016/140017

SUMMARY OF THE INVENTION

Problems to be Solved by the Invention

In an automatic analyzer that performs qualitative and quantitative analysis of a biological sample (hereinafter referred to as a sample) of serum, urine or the like, a reagent for exclusive use is registered and used for each analysis item.

Further, in regard to the analysis item, a physical property (absorbance, scattered light intensity or the like) of a sample (standard sample/calibrator) having a known concentration is measured in advance using a reagent registered earlier to create calibration curve data representative of a relation between concentrations and measurement values (absorbance, scattered light intensity or the like). Then, the concentration of a patient sample is calculated on the basis of the created calibration curve data and analysis parameters and so forth of analysis conditions and so forth set in advance.

In such an automatic analyzer as described above, in the case where the analysis result of a sample suffers from some failure such as anomaly of data, in order to recognize in what manner the applicable analysis item has been measured, it is necessary to check analysis parameters of analysis conditions and so forth set in advance, information on the reagent used in the analysis (reagent information) and so forth to investigate the cause and resolve the problem promptly.

However, according to the technology disclosed in Patent Document 1 above, regarding various kinds of information necessary for investigation of a cause of the failure in the analysis process, pieces of information scattered individually without being specifically linked to each other are merely displayed individually.

Accordingly, a search and collection work of various kinds of information necessary for investigation and a check and information analysis work in which such various kinds of information are used in the case where some failure such as anomaly of data occurs with a sample analysis result are accompanied by complexity, inaccuracy, possibility of misinterpretation of data and so forth. Therefore, in addition to much time and labor, also expertise of screens of the automatic analyzer is needed, and there is room for further improvement in maintainability and operability of the automatic analyzer. Especially, in clinical examination and so forth, it is demanded to further suppress hindrance of business.

In this manner, a quality control system in a current automatic analyzer has a problem that, since statistics of analysis results must be performed by manual operation for each analysis item, quality (deviation) and precision (standard deviation, coefficient of variation) cannot be recognized immediately after the analysis and it is not easy to distinguish whether or not there is the necessity for re-measurement.

Further, when comparison of a variety of types of analysis items, which is demanded for current and future automatic analyzers, is to be performed, each of them must be visually compared with a graph prepared for each analysis item. Therefore, there is a problem that, the more the request for dealing with an increased number of types of analysis items is met, the more difficult the comparison becomes.

The present invention has been made in view of such problems as described above and provides an automatic analyzer that makes investigation in the case where some failure such as anomaly of data occurs with a sample analysis result easier than that in a conventional analyzer.

Means for Solving the Problems

Although the present invention includes a plurality of means for solving the problems described above, one example of the means is an automatic analyzer for dispensing a sample and a reagent into a reaction vessel to react with each other and performing analysis of a liquid obtained by the reaction, the analyzer including an analysis unit that performs the analysis and quality control analysis for ensuring quality of the analysis, a storage unit that stores quality control results of the quality control analysis performed by the analysis unit, a display unit that displays the quality control results, and a control unit that controls an operation of the analysis unit, executes, when an arbitrary result is selected from the quality control results stored in the storage unit, based on the selected quality control result, statistical calculation of the selected result and a quality control result performed in the past, and causes the display unit to display a statistical calculation result.

Advantage of the Invention

According to the present invention, investigation in the case where some failure such as anomaly of data occurs with a sample analysis result can be performed easier than that in a conventional analyzer. Problems, configurations, and advantage other than that described above are made clear by the following description of an embodiment.

BRIEF DESCRIPTION OF THE DRAWINGS

FIG. 1 is a schematic diagram illustrating an overall configuration of an automatic analyzer according to the present invention.

FIG. 2 is a schematic diagram illustrating a representative quality control screen of the automatic analyzer according to the invention.

FIG. 3 is a diagram illustrating a quality control screen when the automatic analyzer according to the invention selects a specific single analysis item.

FIG. 4 is a diagram illustrating an example a statistical chart obtained by statistical calculation of the automatic analyzer according to the invention.

FIG. 5 is a flowchart illustrating a procedure of statistical calculation of the automatic analyzer according to the invention.

FIG. 6 is a flowchart illustrating internal processing of statistical calculation of the automatic analyzer according to the invention.

FIG. 7 is a flowchart illustrating a report output procedure of the automatic analyzer according to the invention.

FIG. 8 is a diagram illustrating a report output screen of the automatic analyzer according to the invention.

FIG. 9 is a diagram illustrating a report screen of the automatic analyzer according to the invention.

MODE FOR CARRYING OUT THE INVENTION

An embodiment of the automatic analyzer of the present invention is described with reference to FIGS. 1 to 9.

Configuration of Automatic Analyzer

First, an overview of an automatic analyzer is described with reference to FIG. 1. FIG. 1 is a view schematically depicting a general configuration of the automatic analyzer according to the present invention.

The automatic analyzer 50 depicted in FIG. 1 is configured from an ISE (Ion Selective Electrode) analysis unit 8, a biochemical analysis unit 9, an immunoassay analysis unit 16, a rack supplying unit 6, sample conveying lines 4 and 5, a rack housing unit 7, buffers 30 and 31, and a control unit.

The ISE analysis unit 8 is an analysis unit that measures an electrolyte concentration in a sample by using an ion selection electrode.

The biochemical analysis unit 9 is an analysis unit that mixes a sample and a reagent for reaction in a reaction vessel (not depicted) mounted on a reaction disk 14, measures the absorbance of the reaction liquid by a photometer, and performs analysis of biochemical ingredients in the sample.

The immunoassay analysis unit 16 is an analysis unit for allowing a sample and a reagent to be mixed for reaction in the reaction vessel (not depicted) mounted on an incubator 21, to perform high-sensitivity analysis of trace components in the blood such as hormone in the sample.

The rack supplying unit 6 supplies a sample rack 3 for supplying a sample to the analysis units 8, 9, and 16 described above.

Each of the sample conveying lines 4 and 5 is configured from a conveyor belt, a motor, and so forth. The conveyor belt supplies a sample rack 3 to each of the analysis units 8, 9, and 16 described above from the rack supplying unit 6, and conveys a sample rack 3 in which a sample for which measurement is completed by the analysis units 8, 9, and 16 to the rack housing unit 7.

The rack housing unit 7 houses therein sample racks 3 that house a sample after measurement.

The buffer 30 temporarily holds a sample rack 3 in which a sample to be analyzed by the biochemical analysis unit 9 is housed. The buffer 31 temporarily holds a sample rack 3 in which a sample to be analyzed by the immunoassay analysis unit 16 is housed.

The control unit is a control device for controlling operation of the components described above and is configured from a control PC 1 and a computer (not depicted) built in the analysis units 8, 9, and 16 and the sample conveying lines 4 and 5.

The control PC 1 has a storage medium 1a such as a HDD built therein and is connected to a monitor 2, a mouse (not depicted), a keyboard (not depicted), a printer (not depicted), a host system (not depicted) in an examination room, an external control server (not depicted) of a manufacturer, and so forth. It is to be noted that the monitor 2 can be formed as that of a touch panel type.

Although the automatic analyzer 50 depicted in FIG. 1 is an example of a configuration that includes a single ISE analysis unit 8, a single biochemical analysis unit 9, and a single immunoassay analysis unit 16, also an automatic analyzer is available which is configured so as to include a plurality of such analysis units 8, 9, and 16.

The foregoing is a general configuration of the automatic analyzer 50.

Analysis Operation

An analysis process of a sample by such an automatic analyzer as described above is generally executed in the following order.

The sample rack 3 that holds a plurality of samples that are to be analyzed by the automatic analyzer 50 is placed on the rack supplying unit 6 by a user.

The automatic analyzer 50 supplies a sample rack 3 placed on the rack supplying unit 6 to one of the analysis units 8, 9, and 16 through the sample conveying line 4. It is to be noted that, before supply to any of the analysis units 8, 9, and 16, the automatic analyzer 50 reads an identifier (hereinafter described), such as a barcode pasted to the sample rack 3 and the samples, by a barcode reader (not depicted) installed in the proximity of the sample conveying line 4, identifies the samples, allocates analysis requests to the samples, and supplies the sample rack 3 to the analysis units 8, 9, and 16 in accordance with the allocated analysis requests.

Each of the analysis units 8, 9, and 16 sucks a sample by a sample probe 13 or 20 from the sample container on the sample rack 3 supplied thereto and carries out analysis processes. After all analysis processes end, the sample rack 3 is conveyed on the sample conveying line 5 and housed into the rack housing unit 7.

Here, as a type of a sample to be analyzed by each of the analysis units 8, 9, and 16 of the automatic analyzer 50, a patient sample, a standard sample, and a QC (quality control) sample are available.

The patient sample is a sample with regard to which an ingredient concentration of an analysis item is unknown, and an ingredient concentration of a target analysis item in the patient sample is obtained by each analysis unit 8, 9, or 16.

The standard sample and the QC sample are samples with regard to which the ingredient concentration of an analysis item is known. The standard sample is a sample for calculating a calibration curve that is a relational expression between an absorbance or a light emission amount measured by a photometer or a detection unit 23 and an ingredient concentration. The QC sample is a sample for performing state control (quality control) of an analysis item or an apparatus.

For the patient sample, standard sample, and QC sample, the sample racks 3 for respective exclusive use are individually used. To each of the sample racks 3, an identifier for the identification of the sample rack 3 such as a barcode is pasted.

Normally, for the identification of a sample, an identifier such as a barcode is pasted also to a sample container in which the sample is housed. However, not all sample containers have an identifier pasted thereto. In the case where an identifier is not pasted to a sample container, for example, for the object of identification of the sample, it is necessary for an identifier and a position number of the sample rack 3 to be inputted from the monitor 2/keyboard/ host system or the like through the control PC 1 in advance.

The automatic analyzer 50 reads the identifier such as the barcode to identify each sample rack 3 and specifies the sample from the inputted position number.

Note that the following description is given of a case in which, to the QC sample described in connection with the present embodiment, a barcode in which information of a QC sample type number (number of the type of the QC sample) and a QC sample lot number (manufacture lot number of the QC sample) is written is pasted. However, there is no difference in significance of identification of a QC sample between this case and a case using a method of identifying a QC sample from an identifier and a position number of a sample rack 3.

Now, an overview of analysis operation of the ISE analysis unit 8, biochemical analysis unit 9, and immunoassay analysis unit 16 is described.

In the ISE analysis unit 8, a predetermined amount of a sample is dispensed into a measurement unit 8b by a sample probe 8a from the sample container of the sample rack 3 transported to the proximity of the sample probe 8a by the sample conveying line 4, and electromotive force is measured by the measurement unit 8b. The measured electromotive force is transmitted to the control PC 1.

While the biochemical analysis unit 9 analyzes the absorbance of reaction liquid composed of reagent and a sample as described above, the sample container placed on the sample rack 3 is moved to a position under a sample probe 13 in an order to be dispensed and the sample is sucked by the probe and dispensed by a predetermined amount into the reaction vessel.

The reaction disk 14 on which the reaction vessel into which the sample is dispensed is mounted is arranged for rotation in a reaction tank controlled to a fixed temperature and moves the reaction vessel described above to a reagent addition position. Then, reagent sucked from a reagent container 15 is added by a predetermined amount by a reagent probe 12.

The reaction vessel after the reagent addition is moved to an agitation position on the reaction vessel, at which agitation is performed. In the case where addition of a reagent is to be performed by a plural number of times, such addition-agitation of reagent as described above is performed further.

The reaction vessel in which the mixture of the sample and the reagent is agitated passes through a flux of light emitted from a light source, and the absorbance when passing is detected by the photometer. The ingredient concentration of a target analysis item is obtained on the basis of the detected absorbance and the calibration curve created before the sample measurement.

The reaction vessel for which the photometry ends is moved to a washing position for a reaction vessel also arranged in the proximity of the reaction disk 14, and the liquid in the inside of the reaction cell is discharged. Further, the reaction vessel is washed first with detergent and then with water and is used for the next analysis.

The reagent container 15 in which reagent is housed is removably held and housed on a reagent disk 10 whose temperature is controlled to a storage temperature for the reagent. Further, the reagent container 15 makes it possible to suck arbitrary reagent by a dispensing mechanism including the movable reagent probe 12 that performs suction and delivery of liquid and the rotatable reagent disk 10 and to deliver the reagent to the reaction vessel.

It is to be noted that the means for holding and housing a reagent container is not limited to that of the disk type and may be of a serial type in which reagent containers are arranged in one or more rows or of a matrix type.

The biochemical analysis unit 9 of the present embodiment includes an auto-loader 11 for automatic replacement of a reagent on the reagent disk 10 and can discharge a reagent container on the reagent disk 10 and house a reagent container to be used newly on the reagent disk 10 without interrupting the analysis operation.

It is to be noted that, though not described in the description of the present embodiment, the biochemical analysis unit 9 occasionally includes the sample probe 13 and the reagent probe 12 for two channels in order to improve the processing capacity and so forth. In this case, they are registered as information of an analysis system number in a QC analysis result hereinafter described.

Also, the immunoassay analysis unit 16 is configured similarly to the biochemical analysis unit 9 such that an arbitrary sample and an arbitrary reagent are delivered by a combination of a sample probe 20, a reagent probe 19, and a reagent disk 17 to the reaction vessel, and that replacement of a reagent container 22 during an analysis operation can be performed by an auto-loader 18.

In immunoassay analysis, reaction is developed by preparing reaction liquid by dispensing for mixing of a sample and reagent into a reaction vessel and keeping the reaction vessel placed for a predetermined period of time on the incubator 21 controlled to a fixed temperature.

Thereafter, the reaction liquid is extracted from the reaction vessel and fed to the detection unit 23, by which the light emission amount of a luminescent sign coupled to the target substance in the reaction vessel is detected. An ingredient concentration of a target analysis item is obtained on the basis of the detected light emission amount and the calibration curve created before the sample measurement.

The immunoassay analysis unit 16 described in the description of the present embodiment includes detection units of two channels capable of independently carrying out a detection process for the detection unit 23 for detecting light emission. This is registered as information of an analysis system number in a QC analysis result hereinafter described.

The biochemical analysis unit 9 and the immunoassay analysis unit 16 use reagents for analysis different from each other, and while housing of reagent is performed individually by the analysis units 8, 9, and 16, control and display of information regarding such reagents are performed by the control PC 1.

What are included in information that must be controlled as reagents for analysis by the automatic analyzer 50 (hereinafter referred to as reagent control items) is described below.

The information includes first a reagent type number indicating for which analysis item the reagent is, and further includes a reagent serial number housed in the container, a lot number upon manufacture (hereinafter referred to as reagent lot number), an unopened expiration date, an onboard expiration date, and so forth.

Although a liquid volume of the reagent housed in the container is further available as the information, this is a remaining amount at the point of time of use and a housed amount at an initial point of time and is controlled by a volume, a weight, or the number of times of analysis (test number).

In regard to those reagent control items, they are controlled either by being stored in a rewritable or read-only storage medium attached to the individual reagent containers 15 and 22, or through collectively storing pieces of information on all reagents housed in the reagent disks 10 and 17 into the storage medium 1a of the control PC 1 described hereinabove. The reagent control items stored in the storage medium 1a of the control PC 1 include the analysis units 8, 9, and 16 in which the reagent containers 15 and 22 in which the reagents are housed are held, position information of the reagent containers 15 and 22 on the reagent disks 10 and 17, and information relating to the state of the reagents (use priorities where a plurality of reagents of a same item exist in the analysis unit, and so forth).

When the reagent container 15 or 22 is carried into the automatic analyzer 50, a reagent control item is read in from the storage medium attached to the container and is transferred to the control PC 1, by which it is collectively controlled together with information relating to reagent control items of the other reagent container 15 or 22 on the reagent disk 10 or 17.

Flow of Series Processes of Display of Statistical Information Screen and Quality Control Screen Now, registration of information relating to a QC sample in the automatic analyzer 50, request for an analysis item for a QC sample, and a series of processes until an analysis result is obtained are described with reference to FIGS. 2 to 9.

Note that it is assumed that information relating to analysis items that can be analyzed by each of the analysis units 8, 9, and 16 (analysis conditions, information relating to reagents to be used for the analysis items, and so forth) and information on reagents necessary for analysis have been registered already by such a method as described above.

1. A user of the automatic analyzer 50 of the present embodiment operates a keyboard or the like to register information relating to a QC sample into the control PC 1. The information to be registered is information of, for example, a type number, a lot number, a name, and so forth of the QC sample.

2. Then, the user operates the keyboard or the like to set a control value for each analysis item (mean control value 105 depicted in FIG. 2 and so forth, upper-limit control value 106 of FIG. 2 and so forth, and lower-limit control value 107 of FIG. 2 and so forth) for the QC sample registered 1. described above.

It is to be noted that, as regards the upper-limit control value 106 or the lower-limit control value 107, the control PC 1 of the automatic analyzer 50 occasionally calculates a upper-limit control value/lower-limit control value from a mean control value and a control SD value set by the user. For example, they can be calculated from such expressions as upper-limit control value=mean control value+N×control SD value, and lower-limit control value=mean control value−N×control SD value (N is a positive number).

3. Then, the user operates the keyboard or the like to set a request for an analysis item for the QC sample.

4. Then, a sample rack 3 for a QC sample that holds a QC sample (with a barcode indicative of a QC sample type number and a QC sample lot number) is placed on the rack supplying unit 6 by the user.

5. Then, the automatic analyzer 50 renders the components of the analysis units 8, 9, and 16 operative to analyze the analysis item requested in "3." by control of the control PC 1.

6. Then, the automatic analyzer 50 registers an analysis result where the QC sample is used as a quality control result into the storage medium 1a or the like.

In the registration into a quality control result in this "6.," each piece of the registration information and the analysis result described above are controlled in regard to the following four points.

Occurrence of each of events of 0: QC result output, 1: carrying out of calibration, and 2: changeover of the current reagent is registered as an event ID.

An analysis result of a specific item is numbered and controlled as an analysis item number.

As numbers to be used for specification of measurements of the QC sample to be executed at predetermined intervals before measurement, after measurement, and during measurement of a sample, a trace number is used to control data in regard to what numbered data in QC measurement time number the data is.

Whether or not an anomaly alarm raised is decided from a data alarm number.

For registration of each of the analysis results, the following examples are available.

1. Event ID (Event ID) (0: QC result, 1: Calibration carried out, 2: Changeover of the current reagent), 2. Analysis item number (Test No.), 3. Trace number (Trace No.), 4. Analysis item name (Test Name), 5. Reagent lot number (Reagent Lot), 6. Reagent serial number (Reagent Serial No.), 7. Measurement analysis unit number (Analytical Unit), 8. Measurement analysis system number (Channel), 9. Reagent position (Reagent Position), 10. Reagent use priority order (Reagent Priority), 11. QC sample name (QC), 12. QC sample lot number (QC Lot), 13. Mean control value (Target Mean (T. Mean)), 14. Upper-limit control value (Upper Limit (UL)), 15. Lower-limit control value (Lower Limit (LL)), 16. Analysis result (Result), 17. Measurement day and time (Result Time), 18. Data alarm number (Alarm) (0: No alarm, any other than 0: Alarm present), 19. QC result ID (QC ID), 20. Display unit (Unit).

Quality Control Screen

Now, details of quality control screens 100 and 200 displayed on the monitor 2 are described with reference to FIGS. 2 and 3. FIG. 2 depicts a representative view of the quality control screen 100, and FIG. 3 depicts a representative example of the quality control screen 200.

As analysis of a sample is successively performed by the automatic analyzer 50, an abnormal analysis result sometimes appears from some reason. In such a case as just described, in order to recognize in what manner the applicable analysis item has been measured, it is a practice to check information on a reagent used in the analysis (reagent information) and so forth to investigate the cause. The quality control screen 100, the quality control screen 200, a statistical calculation screen 300, a report output screen 700, and a report screen 800 described below are screen images that are automatically displayed on the monitor 2 in response to a user operation or by the control PC 1 of the automatic analyzer 50.

Referring to FIG. 2, in the quality control screen 100, a quality control graph 101 displays analysis results chronologically on a graph. The axis of abscissa is measurement time and displays the analysis results in order from the old one from the left to the right. In FIG. 2, one result of a requested specific analysis item is displayed as one point. The displaying of the quality control screen 100 and various operations based on the substance of the display are executed by the control PC 1 that recognizes that the keyboard or the like is operated by the user of the automatic analyzer 50.

On the axis of ordinate on the right side of the quality control graph 101, a mean control value 105, an upper-limit control value 106, and a lower-limit control value 107 that are control values set when registration of the QC sample is registered are displayed.

Further, in the quality control graph 101, when an analysis result 108 of a test 1 and an analysis result 109 of a test 2 between which the analysis item is different are to be displayed, points to be displayed are preferably made different in appearance such as shape or color between different items.

Though not depicted in the figures, such display for making the appearances of analysis results of analysis items different from each other can be targeted also to the measurement date, and it is efficient to display a result on the day of measurement and a result on a day preceding to the day of measurement in different displaying manners.

Further, in the case where the upper-limit control value 106 or the lower-limit control value 107 is exceeded, it is preferable to display this by a display different from the analysis results 108 and 109 like an out of range 110.

Furthermore, as regards analysis results of the quality control graph 101, it is preferable to make it possible to display also results for a long period of time using a cursor bar 111.

In the quality control screen 100, when a selection button 112 is selected, an analysis item selection screen 113 is displayed. In regard to a display method of analysis items of quality control analysis to be displayed on the quality control graph 101, the display method is preferably selectable through an all button 114 for displaying all results and a selection button 115 for displaying a specific analysis item. A currently selected analysis item is displayed in an analysis item display area 116.

When the user intends to have a specific analysis item displayed, the user inputs an analysis item to be selected from among analysis items displayed in an item list 117 to an input field 118 and depress a search button 119. A result of this is displayed in the item list 117, and by selecting an analysis item (test 2) intended to be displayed in the item list 117 and depressing a selection button 120 to decide the selection, quality control results to be displayed as a chart in the quality control graph 101 can be restricted to those of the same analysis item.

It is to be noted that, while the quality control screen 100 depicted in FIG. 2 indicates an example of search by an analysis item, a reagent lot/type of a QC sample/lot of a QC sample/analysis unit 8, 9, 16/whether analysis systems are the same or different and so forth are also preferably made a search condition. Such search is executed if the search button 119 is depressed.

When selection of an analysis item is to be cancelled on the analysis item selection screen 113, the user operates the keyboard or the like to depress a cancel button 121.

On the quality control graph 101, if one point displayed is selected, then, the selected point is displayed by a selection line 122. Further, detailed information of the point is displayed in a detailed information display area 123 at a lower portion of the quality control graph 101. In the detailed information display area 123, information registered after measurement is displayed.

In FIG. 2, such information as the analysis result by the test 2 of the QC 1=1550 can be checked from the detailed information display area 123. When to represent analysis results of a plurality of items whose control ranges are different from each other in a same graph by the quality control graph 101 in the present screen, all analysis results are standardized and plotted, using a mean control value as a reference value (0 point), by in the case of analysis result>mean control value, (analysis result−mean control value)/(upper-limit control value−mean control value)

in the case of analysis result<mean control value, (analysis result−mean control value)/(mean control value−lower-limit control value).

For example, a point 125 and a point 126 are analysis results (mean control value=1100, lower-limit control value=600, upper-limit control value=2000) of the test 2 of the QC 1, and the analysis results of them are each 1550 (point 125) and 850 (point 126). In the measurement points standardized as described above, the analysis result of the point 125 is 0.5 (=(1550−1100)/(2000−1100)) and the analysis result of the point 126 is −0.5 (=(850−1100)/(1100−600)), and the points 125 and 126 are points at distances equal to each other in the upward and downward direction from the line 124 of the mean control value.

Further, when the selection button 120 is depressed while the selection line 122 is displayed, i.e., while a specific point is selected from among displayed points, the display is switched to such a quality control screen 200 for a specific item as depicted in FIG. 3.

Basic information displayed in the quality control screen 200 of FIG. 3 is the same as that of the quality control graph 101, selection button 112, analysis item display area 116, detailed information display area 123, and so forth in the quality control screen 100 depicted in FIG. 2.

Similarly as in the quality control screen 100 of FIG. 2, also in the quality control screen 200 depicted in FIG. 3, if one point displayed (statistical calculation target point 204) is selected, then detailed information of the selected point is displayed in the detailed information display area 123.

The differences exist in that: in a quality control graph 101A, timings at which calibration is carried out are displayed as a calibration line 201, replacement timings of a reagent bottle are displayed as a reagent changeover line 202, and timings at which both calibration and changeover are carried out are displayed as a line 203. An enhanced effect of such lines 201, 202, and 203 is achieved by displaying them in the case where analysis items are the same as each other.

It is to be noted that, although a case in which only a specific analysis item is extracted is described with reference to FIG. 3, extraction points according to a plurality of conditions from among the search conditions described hereinabove (analysis item/reagent lot/QC sample/QC sample lot/analysis unit/analysis system, and so forth) can be plotted.

For example, in the case where conditions of an analysis item of the Test 1 or the Test 2, a QC sample of the QC 1, QC 2, or QC 3, and an analysis unit of AU 1 or AU 2 (in this case, for all reagent lots, QC sample lots, and analysis systems) are to be extracted from among the quality control results stored in a recording medium or the like, QC results that satisfy an extraction condition (plural selections of each extraction condition are logically or) like (analysis item=Test 1 or Test 2) and (QC sample=QC 1 or QC 2 or QC 3) and (analysis unit=AU 1 or AU 2) are extracted and plotted.

Statistical Calculation Screen, Statistical Calculation, and Flow of Data Extraction in Statistical Calculation Now, the statistical calculation screen 300 displayed on the monitor 2 and details of processes for displaying the statistical calculation screen are described with reference to FIGS. 4 to 6.

FIG. 4 depicts an example of a statistical chart obtained by carrying out statistical calculation, FIG. 5 depicts a procedure of the statistical calculation, and FIG. 6 depicts internal processing of the statistical calculation.

In such a statistical calculation screen 300 as depicted in FIG. 4, an item name 303A, a quality control result number 303B, a mean value 303C, a standard deviation 303D, a coefficient of variation 303E, and a deviation 303F used in statistical calculation are displayed. Further, in addition to the above, a name of a reagent lot or a QC sample, a lot of a QC sample, a period during which a target quality control result is obtained, and so forth can be displayed.

In this statistical calculation screen 300, an input field 301 for inputting a quality control result number to be used in statistical calculation and a calculation button 302 for executing statistical calculation are displayed further.

Display control of such a statistical calculation screen 300 as just described is described below with reference to FIGS. 5 and 6.

Referring to FIG. 5, in a state in which a specific point is selected on the selection line 122 (step S401) in a case where the quality control screen 100 depicted in FIG. 2 is displayed on the monitor 2 and when the control PC 1 recognizes that the user operates the keyboard or the like to depress a statistical chart button 205 disposed at a lower right portion of the quality control screen 100 (step S402), or in a state in which a statistical calculation target point 204 is selected (step S401) in a case where the quality control screen 200 depicted in FIG. 3 is displayed on the monitor 2 and when the control PC 1 recognizes that the user operates the keyboard or the like to depress the statistical chart button 205 disposed at a lower right portion of the quality control screen 200 (step S402), the control PC 1 first causes the monitor 2 to display a statistical calculation screen 300 (step S403).

At the stage of step S403, in the displayed statistical calculation screen, only a particular name of the item name 303A used in the statistical calculation is displayed, and specific numerical values including the quality control result number 303B, mean value 303C, standard deviation 303D, coefficient of variation 303E, and deviation 303F are each displayed by displaying either a result obtained through a statistical calculation performed using an initial value set in advance in the input field 301 or a blank space.

Further, when the statistical calculation screen 300 is to be displayed, the number of input fields 301 equal to the number of analysis results to be made a target when statistical calculation is performed are displayed on the statistical calculation screen 300 such that the number of quality control results to be used for statistical calculation can be changed arbitrarily.

The input field 301 has a state in which the numerical value 30 that is common as an initial value is inputted.

However, in the case where the number of analysis results in the past is smaller than the inputted value, the control PC 1 executes statistical calculation using a maximum value of the number of analysis results without using the inputted value.

Then, when the control PC 1 recognizes that a numeral is inputted to the input field 301 (step S404) and besides recognizes that the calculation button 302 is depressed (step S405), the control PC 1 executes statistical calculation and displays a result of the statistical calculation in the quality control result number 303B, mean value 303C, standard deviation 303D, coefficient of variation 303E, and deviation 303F in the statistical calculation screen 300 (step S406).

Thereafter, the control PC 1 determines whether or not the closing button 304 is depressed (step S407), and, when it is decided that the closing button 304 is not depressed, the control PC 1 continues the display of the statistical calculation screen 300 until a new instruction for the statistical calculation (steps S404 and S405) is performed. On the other hand, when it is decided that the closing button 304 is depressed, the control PC 1 closes the statistical calculation screen 300 and causes the quality control screen 100 depicted in FIG. 2 or the quality control screen 200 depicted in FIG. 3 to be displayed again.

Now, internal processing of the statistical calculation in step S406 of FIG. 5 is described with reference to FIG. 6.

When it is decided that the calculation button 302 of the statistical calculation screen 300 in FIG. 4 is depressed, the control PC 1 acquires information of an analysis item at a specific point on the selection line 122 or at the statistical calculation target point 204 from the storage medium 1a (step S501).

Then, the control PC 1 acquires information of a quality control result of the statistical calculation target point and of a quality control result at a point of time preceding by an amount equal to the numeral inputted to the input field 301 from the statistical calculation target point, from the storage medium 1a (step S502).

Then, in order to perform screening of the quality control result acquired at step S502 and determined as a statistical calculation target, the control PC 1 starts a loop of processes in steps S504 to S510 (step S503). In step S503, it is decided whether or not the number of screened statistical calculation target points is equal to N inputted at step S404 in FIG. 5.

First, the control PC 1 decides whether or not the QC sample used in the quality control result of the statistical calculation target and the lot number of the QC sample are the same as those of the statistical calculation target point (step S504). When it is decided that the QC sample and the lot number are the same, the processing advances to step S505, but, when it is decided that the QC sample and the lot number are not same, the processing advances to step S510.

Then, the control PC 1 decides whether or not the application number (analysis item) of the quality control result of the statistical calculation target is equal to that of the statistical calculation target point (step S505). When it is decided that the application number is equal, the processing advances to step S506, but when it is decided that the application number is not equal, the processing advances to step S510.

Then, the control PC 1 decides whether or not the reagent lot number of the quality control result of the statistical calculation target is equal to that of the statistical calculation target point (step S506). When it is decided that the reagent lot number is equal, the processing advances to step S507, but when it is decided that the reagent lot number is not equal, the processing advances to step S510.

Then, the control PC 1 checks the measurement date and time of the quality control result of the statistical calculation target and decides whether or not the quality control result of the statistical calculation target is a result before the selection item (step S507). When it is decided that the first-mentioned result is a result before the selection item, the processing advances to step S508, but when it is determined that the first-mentioned result is not a result before the selection item, the processing advances to step S510.

Then, the control PC 1 decides whether or not a data alarm is included in the quality control result of the statistical calculation target (step S508). When it is decided that an alarm is not included, the processing advances to step S509, but when it is decided that an alarm is included, the processing advances to step S510.

If the decision of Yes is obtained at all steps S504 to S508, then the quality control result is made a target of the statistical calculation (step S509), but if the decision of No is obtained at any one of the steps, then the quality control result is excluded from a target of the statistical calculation (step S510).

After the screening relating to one quality control result ends (step S509 or step S510), the processing returns to step S503 and the same steps are repetitively performed for an analysis result at a further preceding point of time.

After the processing is looped by the number of the numeral inputted to the input field 301, the control PC 1 calculates a mean value (step S511), a standard deviation SD (step S512), a coefficient of variation CV (step S513), and a deviation (step S514) by only the data that is made the statistical calculation target, and displays a result of the calculation on the statistical calculation screen 300 (step S515). It is to be noted that the processes at steps S511 to S514 may be performed not in order or may be executed at the same time.

As a particular example, if it is assumed that data displayed on the quality control screen 200 of FIG. 3 is all measurement data, then the calculation button 302 is depressed at N=30 inputted as the initial value. However, even if data at N=30 is intended to be output from the selected analysis result, there is only data at N=6. Further, since one point from among N=6 is lower than a lower-limit control value 107, data alarm is applied. Therefore, "5" is displayed in the number of points 303B. As a result, statistical results for five points are displayed in each of the items 303C to 303F.

Report Output

Now, details of a report screen 800 to be displayed on a monitor 2 and a process for report printing are described with reference to FIGS. 7 to 9. A report output procedure, a report output screen, and a report screen are depicted in FIGS. 7, 8, and 9, respectively.

As depicted in FIG. 7, when the control PC 1 recognizes that a report button 206 disposed at a lower left portion of the quality control screen 100 or 200 is depressed in a state in which the selection line 122 is selected on the quality control screen 100 of FIG. 2 or another state in which the statistical calculation target point 204 is selected on the quality control screen 200 of FIG. 3 (step S601), the control PC 1 controls the monitor 2 to display such a report output screen 700 as depicted in FIG. 8 (step S602).

After the report output screen 700 is displayed on the monitor 2, in the case where a statistical calculation target period is to be inputted, the user selects a period button 701 and input a period, but in the case where a number is to be inputted, the user selects a quantity button 702 and input a predetermined numerical value. When the control PC 1 recognizes that the period button 701 is selected and a period is inputted or the quantity button 702 is selected and a predetermined numerical value is inputted (step S603) and besides the report output button 703 is depressed (step S604), the control PC 1 controls the monitor 2 to display such a report screen 800 as depicted in FIG. 9 (step S605).

When the control PC 1 recognizes that a print button 801 disposed at a lower portion of the report screen 800 is depressed in a stage in which the report screen 800 is displayed, the control PC 1 outputs report data to printing equipment such as a printer so as to be printed on paper (step S606).

Subsequently, details of the report screen 800 are described with reference to FIG. 9.

In the report screen 800 depicted in FIG. 9, an item selected by the statistical calculation and a result that satisfies the conditions for the same item, same reagent lot, same QC sample, and same QC sample lot are displayed as a report chart 802. On the axis on the left side of the report chart 802, a measured value 803, an upper-limit control value 804, and a lower-limit control value 805 are displayed.

Further, on the upper side of the report chart 802, a specific numerical value inputted by the period button 701 or the quantity button 702 of the report output screen 700 is displayed as an arithmetic operation target 806.

A detail screen 807 of analysis results after the statistical calculation is displayed on the lower side of the report chart 802. In the detail screen 807, a quality control result, presence or absence of alert of the quality control result, analysis date and time, a unit, a reagent serial No. used for analysis, a mean control value, a control standard deviation, a deviation, and so forth are displayed.

Information not capable of being displayed on the detail screen 807 can be viewed using a scrollbar 808 on the right side of the report chart 802.

In the case where it is desired to view the display of the report screen 800 in an enlarged scale, a magnification button 809 disposed at a lower right portion of the report screen 800 is depressed.

When the report screen 800 is to be closed, a closing button 810 is depressed. When the closing button 810 is depressed, the report screen 800 is closed and the quality control screen 100 depicted in FIG. 2 or the quality control screen 200 depicted in FIG. 3 is displayed again.

Now, advantageous effects of the present embodiment are described.

The automatic analyzer 50 of the present embodiment described above includes the analysis unit 8, 9, or 16 that performs analysis and quality control analysis for ensuring quality of the analysis, the storage medium 1a that stores quality control results of the quality control analysis performed by the analysis unit 8, 9, or 16, the monitor 2 that displays the quality control results, and the control PC 1 that controls an operation of the analysis unit 8, 9, or 16. Further, the control PC 1 executes, when an arbitrary result is selected from the quality control results stored in the storage medium 1a, statistical calculation of the selected result and a quality control result performed in the past as compared to the selected result with reference to the selected quality control result, and causes the monitor 2 to display a statistical calculation screen 300 that is a result of the statistical calculation.

Consequently, in the case where some failure such as anomaly of data of a sample analysis result occurs, if the user checks results of various kinds of statistical calculation of the analysis results of the QC sample displayed on the statistical calculation screen 300, then the user can intuitively recognize whether a problem occurs with the "analysis unit 8, 9, or 16" or an analysis parameter, whether a problem occurs in "calibration," whether a problem occurs in a "reagent" or a "QC sample," or the like. In particular, since searchability or visibility of various kinds of information relating to failure investigation on the automatic analyzer 50 side can be improved, reduction of time required for investigation and analysis of a failure and improvement of the reliability can be achieved.

Further, since the number of quality control results to be used for statistical calculation can be changed arbitrarily by displaying the input field 301 of the statistical calculation screen 300, the user can freely search for time at which it is supposed that the failure occurred and prompt specification of a failure can be implemented.

Further, by limiting quality control results carried out in the past for statistical calculation use only to data in which at least one of the analysis item, reagent lot, and analysis unit 8, 9, or 16 is the same, the possibility can be reduced that a factor other than the failure enters results of various statistical calculations and statistical calculation can be performed with higher quality and besides the period of time required for investigation and analysis of a failure can be reduced further.

Also, by limiting quality control results performed in the past for the statistical calculation use only to data in which one of the analysis unit 8, 9, or 16 and an analysis type is the same or only to data in which all of the analysis item, reagent lot, QC sample, and QC lot are the same, the possibility can be reduced that a factor other than a failure enters results of various statistical calculations, and statistical calculation can be performed with higher quality and besides the period of time required for investigation and analysis of a failure can be reduced further.

Further, by including at least the quality control result number 303B, mean value 303C, standard deviation 303D, coefficient of variation 303E, and deviation 303F, which are used in the statistical calculation, in the items to be displayed on the statistical calculation screen 300, the user can easily recognize a dispersion of the analysis results of the QC sample, and the efficiency of failure investigation can be improved still more.

Furthermore, by further including at least one of the item name 303A, reagent lot, QC sample name, QC sample lot, and period within which a quality control result of a target is performed, which are used for the statistical calculation, in the items to be displayed on the statistical calculation screen 300, the user can easily recognize information relating to a dispersion of the analysis results of the QC sample and further improvement of the efficiency in failure investigation can be implemented.

Further, by normalizing the quality control results to be stored into the storage medium 1a with the upper-limit control value 106 and the lower-limit control value 107 and causing the standardized quality control results to be displayed on the monitor 2 in a time series in a chart by one quality control screen 100 or by a quality control graph 101 or 101A of a quality control screen 200, the analysis results of the QC sample are displayed in a time series collectively for all analysis items or for each analysis item. Therefore, it is possible to recognize a pattern of variation of the analysis results in the past of the quality control results, and the searchability and the visibility of various kinds of information can be improved further.

Further, in regard to the upper-limit control value 106 and the lower-limit control value 107, a case in which a control standard deviation set in the QC sample is used and another case in which a value inputted by a user is used can be selected. Therefore, the setting for an upper limit and a lower limit for an abnormal value of an analysis result of quality control analysis can be changed suitably in response to the type, the lot, or the like of the QC sample. Further, since the setting for display of the statistical calculation screen 300 or display of the quality control screen 100 or 200 can be changed suitably according to an operational status, specification of a failure can be performed with higher quality.

Further, since, when displaying the quality control results in a time-series in a chart, dates on which the quality control analysis is executed are displayed separately, a date on which it is decided that a failure occurred can be recognized easily, and specification of a failure is facilitated more.

Furthermore, when an arbitrary quality control result is selected from among the quality control results displayed in a time series in a chart, through the selection line 122 or a statistical calculation target point 204, the detail information display area 123 of the selected quality control result is displayed in the same quality control screen 100 or the quality control screen 200 of the monitor 2. Therefore, it becomes possible for the user to more particularly recognize detailed information of an analysis result or the like that is decided as a failure occurred, and specification of a failure is further facilitated.

Further, by causing, when an arbitrary quality control result is selected from among the quality control results displayed in a time series in a chart through the selection line 122 or a statistical calculation target point 204, details of the selected quality control result to be displayed as a report screen 800 on the monitor 2, the analysis result of the quality control analysis can be left as a record in a visually superior form. When a failure is investigated, comparison with other analysis items is further facilitated, and therefore, specification of a failure can be performed more easily.

Furthermore, since the target period of quality control results or the number of quality control results to be included in the report screen 800 can be arbitrarily designated through the period button 701 or the quantity button 702, the range of analysis results to be displayed in the report can be changed freely, and comparison of the analysis results can be performed more freely.

Further, by causing the report screen 800 to include at least one or more of the target period or number (arithmetic operation target 806), an analysis item and its reagent lot, the QC sample and its lot, a mean value, a standard deviation, a coefficient of variation, a deviation, and a time-series chart, information relating to analysis results to be displayed by the report can be enriched, and comparison of the analysis results can be performed more accurately and more easily.

Furthermore, by limiting the quality control results to be displayed in a chart to that extracted according to an item selected from at least one of an analysis item, a reagent lot, a QC sample, a lot of the QC sample, and the analysis unit 8, 9, or 16, analysis results to be displayed on the quality control graph 101 can be restricted to those that are unified by some item. Therefore, by changing the extraction item when a failed portion is to be specified, the user can recognize more easily what is wrong with the quality control results, and specification of a failure is further facilitated.

Further, by limiting the quality control results to be displayed in a chart to the same analysis item, only results of a same analysis item that have unity most as analysis results to be displayed in the quality control graph 101 or 101A can be displayed first on the quality control screen 100 or 200, and materials for decision can be presented promptly to the user.

Furthermore, when displaying the quality control results in a chart by limiting to the same analysis item, a calibration execution timing or a replacement timing of a reagent bottle is indicated clearly as the calibration line 201, reagent changeover line 202, or timing line 203. Therefore, whether a problem occurs in the "calibration" or a problem occurs in the "reagent" can be recognized more easily, and specification of a failure can be performed more easily.

Others

It is to be noted that the present invention is not limited to the embodiment described above and can be modified and applied in various manners. The embodiment described above is explained particularly in order to facilitate the understanding of the present invention and is not necessarily limited to those that include all configurations described hereinabove.

DESCRIPTION OF REFERENCE CHARACTERS

1: Control PC
1a: Storage medium
2: Monitor
3: Sample rack
4, 5: Sample conveying line
6: Rack supplying unit
7: Rack housing unit
8: ISE analysis unit
8a: Sample probe
8b: Measurement unit
9: Biochemical analysis unit
10: Reagent disk
11: Auto-loader
12: Reagent probe
13: Sample probe
14: Reaction disk
15: Reagent container
16: Immunoassay analysis unit
17: Reagent disk
18: Auto-loader
19: Reagent probe
20: Sample probe
21: Incubator
22: Reagent container
23: Detection unit
30, 31: Buffer
50: Automatic analyzer
100, 200: Quality control screen
101, 101A: Quality control graph
105: Mean control value
106: Upper-limit control value
107: Lower-limit control value
108, 109: Analysis result
110: Out of range
111: Cursor bar
112: Selection button
113: Analysis item selection screen
114: All button
115: Selection button
116: Analysis item display area
117: Item list
118: Input field
119: Search button
120: Selection button
121: Cancel button
122: Selection line
123: Detailed information display area
124: Line
125,126: Point
201: Calibration line
202: Reagent changeover line
203: Timing line
204: Statistical calculation target point
205: Statistical chart button
206: Report button
300: Statistical calculation screen
301: Input field
302: Calculation button
303A: Item name
303C: Mean value
303D: Standard deviation
303E: Coefficient of variation
303F: Deviation
304: Closing button
700: Report output screen
701: Period button
702: Quantity button
703: Report output button
800: Report screen
801: Print button
802: Report chart
803: Measured value
804: Upper-limit control value
805: Lower-limit control value
806: Arithmetic operation target
807: Detail screen
808: Scrollbar
809: Magnification button
810: Closing button

The invention claimed is:

1. An automatic analyzer for dispensing a sample and a reagent into a reaction vessel to react with each other and performing analysis of a liquid obtained by the reaction, the automatic analyzer comprising:
a computer;
an analysis unit, coupled to the computer, configured to perform the sample analysis and a quality control analysis of a plurality of quality control samples for ensuring quality of the sample analysis;
a storage unit, coupled to the computer, that stores a plurality of quality control results of respective quality control analysis previously performed by the analysis unit; and
a display unit, coupled to the computer,
wherein the computer is programmed to:
display, simultaneously, on a first screen, a graph and an information area, the graph having a first axis perpendicular to a second axis, the first axis indicating time and the second axis indicating measurement result values, the graph displaying a first measurement result of a first quality control sample and a first deviation value which is displayed a predetermined deviation from the first measurement result and displaying a second measurement result of a second quality control sample and a second deviation value which is displayed a predetermined deviation from the first measurement result, the first measurement value and the first deviation point being displayed on the graph with a first symbol and the second measurement value and the second deviation point being displayed on the graph with a second symbol, which is different than the first symbol, and a horizontal line indicating a predetermined mean measurement result value, the information area being displayed below the graph and displaying at least a predetermined mean measurement result value and the first measurement result corresponding to the first quality control sample in association with each other, receive a selection of the first measurement value and upon receiving the selection of the first measurement value, display a vertical selection line through the first symbol, receive, via a second screen, an input of a quality control result number that corresponds to one of the plurality of quality control samples, and based on the selected first measurement value of the first quality control sample, execute a statistical calculation of the first measurement result of the first quality control sample and a measurement of the one quality control sample indicated by the input quality control result number measured before the first measurement result, and causes the display unit to display a statistical calculation result on a third screen of the display unit, wherein the first measurement result of the first quality control sample and the first deviation value are displayed equidistant with respect to the horizontal line of the predetermined mean measurement value on the graph.

2. The automatic analyzer according to claim 1, further comprising:
a plurality of analysis units including the analysis unit,
wherein the one quality control sample used in the statistical calculation has a same a reagent lot, and analysis as the first quality control sample.

3. The automatic analyzer according to claim 2,
wherein items to be displayed in the statistical calculation result include at least thoa number of the quality control results used for the statistical calculation, a mean value, a standard deviation, a coefficient of variation, and a deviation.

4. The automatic analyzer according to claim 1,
wherein the items to be displayed in the statistical calculation result further include any one of an item name used for the statistical calculation, a reagent lot, a QC sample name, a lot of the QC sample, and a period during which the quality control result of an object is performed.

5. The automatic analyzer according to claim 1,
wherein the computer is configured to display, as horizontal lines on the graph, upper-limit and lower-limit control values based on a previously determined standard deviation or input via the first screen.

6. The automatic analyzer according to claim 1,
wherein the computer is programmed to, upon selection of the first measurement result on the display detailed information of the selected first measurement result in the information area of the first screen.

7. The automatic analyzer according to claim 2,
wherein the computer limits the quality control results, to be displayed in the graph, to one extracted by the item selected from at least one of an analysis item, a reagent lot, one of the plurality of quality control samples, a lot of the one of the plurality of QC samples, an analysis unit of the plurality of analysis units, and an analysis system.

8. The automatic analyzer according to claim 7,
wherein the control unit limits the quality control results, to be displayed in the chart, to the same analysis item.

9. The automatic analyzer according to claim 8,
wherein the computer is programmed to display, simultaneously, on the graph at least one of a replacement timing of a reagent bottle and a calibration execution timing, which are represented by vertical lines on the graph.

* * * * *